(12) United States Patent
Kawano et al.

(10) Patent No.: US 10,878,814 B2
(45) Date of Patent: Dec. 29, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 16/304,494

(22) PCT Filed: Apr. 14, 2017

(86) PCT No.: PCT/JP2017/015373
§ 371 (c)(1),
(2) Date: Nov. 26, 2018

(87) PCT Pub. No.: WO2018/016143
PCT Pub. Date: Jan. 25, 2018

(65) Prior Publication Data
US 2019/0304452 A1 Oct. 3, 2019

(30) Foreign Application Priority Data
Jul. 22, 2016 (JP) .................................. 2016-144328

(51) Int. Cl.
*G10L 15/04* (2013.01)
*G10L 15/22* (2006.01)
*G10L 15/00* (2013.01)
*G10L 25/78* (2013.01)
*G06F 3/16* (2006.01)
*G10L 15/06* (2013.01)

(52) U.S. Cl.
CPC ................ *G10L 15/22* (2013.01); *G06F 3/16* (2013.01); *G10L 15/005* (2013.01); *G10L 15/04* (2013.01); *G10L 25/78* (2013.01); *G10L 2015/0631* (2013.01)

(58) Field of Classification Search
None
See application file for complete search history.

(56) References Cited

U.S. PATENT DOCUMENTS

| | | | | |
|---|---|---|---|---|
| 8,214,213 B1 * | 7/2012 | Ljolje | ................... | G10L 15/187 704/243 |
| 2003/0055646 A1 * | 3/2003 | Yoshioka | ................ | G10L 25/93 704/258 |
| 2014/0003610 A1 * | 1/2014 | Kim | ........................ | H04R 3/00 381/61 |

(Continued)

*Primary Examiner* — Abul K Azad
(74) *Attorney, Agent, or Firm* — Paratus Law Group, PLLC

(57) ABSTRACT

There is provided an information processing apparatus, information processing method, and program that make it possible to appropriately determine the cluster segment of the character string group that is specified on the basis of the speech recognition of the collected speech. The information processing apparatus includes: an acquisition unit that acquires a detection result relating to a variation of a sound attribute of a collected speech; and a determination unit that determines, on the basis of the detection result, a cluster segment relating to a character string group that is specified on the basis of speech recognition of the speech.

19 Claims, 9 Drawing Sheets

(56) References Cited

U.S. PATENT DOCUMENTS

2014/0304606 A1* 10/2014 Ohmura .................. G06F 3/167
　　　　　　　　　　　　　　　　　　　　　　　715/728
2016/0098993 A1*　4/2016 Yamamoto .............. G10L 17/02
　　　　　　　　　　　　　　　　　　　　　　　704/234

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/015373 (filed on Apr. 14, 2017) under 35 U.S.C. § 371, which claims priority to Japanese Patent Application No. 2016-144328 (filed on Jul. 22, 2016), which are all hereby incorporated by reference in their entirety.

TECHNICAL FIELD

The present disclosure relates to an information processing apparatus, an information processing method, and a program.

BACKGROUND ART

Conventionally, various technologies relating to natural language processing have been proposed. For example, in Patent Literature 1 below, a technology of drafting a sentence on the basis of words and phrases selected by a user from among a plurality of words and phrases has been disclosed.

Further, various technologies relating to speech recognition have been proposed. With the speech recognition, it is possible to convert a speech when a user speaks into character strings.

CITATION LIST

Patent Literature

Patent Literature 1: JP 2012-53634A

DISCLOSURE OF INVENTION

Technical Problem

Incidentally, it is also desirable to cause a character string group acquired from a speech recognition result of a collected speech to be grouped into a plurality of groups. However, in the conventional technologies, a cluster segment of the character string group is fixedly determined regardless of a sound attribute of the collected speech. For this reason, in the conventional technologies, the cluster segment may be determined inappropriately in some character string groups, for example.

Accordingly, the present disclosure proposes a novel and improved information processing apparatus, information processing method, and program that make it possible to appropriately determine the cluster segment of the character string group that is specified on the basis of the speech recognition of the collected speech.

Solution to Problem

According to the present disclosure, there is provided an information processing apparatus including: an acquisition unit that acquires a detection result relating to a variation of a sound attribute of a collected speech; and a determination unit that determines, on the basis of the detection result, a cluster segment relating to a character string group that is specified on the basis of speech recognition of the speech.

In addition, according to the present disclosure, there is provided an information processing method including: acquiring a detection result relating to a variation of a sound attribute of a collected speech; and determining, by a processor on the basis of the detection result, a cluster segment relating to a character string group that is specified on the basis of speech recognition of the speech.

In addition, according to the present disclosure, there is provided a program that causes a computer to function as: an acquisition unit that acquires a detection result relating to a variation of a sound attribute of a collected speech; and a determination unit that determines, on the basis of the detection result, a cluster segment relating to a character string group that is specified on the basis of speech recognition of the speech.

Advantageous Effects of Invention

As described above, according to the present disclosure, it is possible to appropriately determine the cluster segment of the character string group that is specified on the basis of the speech recognition of the collected speech. Moreover, the effects described herein are not necessarily limited, and any of the effects described in the present disclosure may be applied.

MODE(S) FOR CARRYING OUT THE INVENTION

Figure 1:
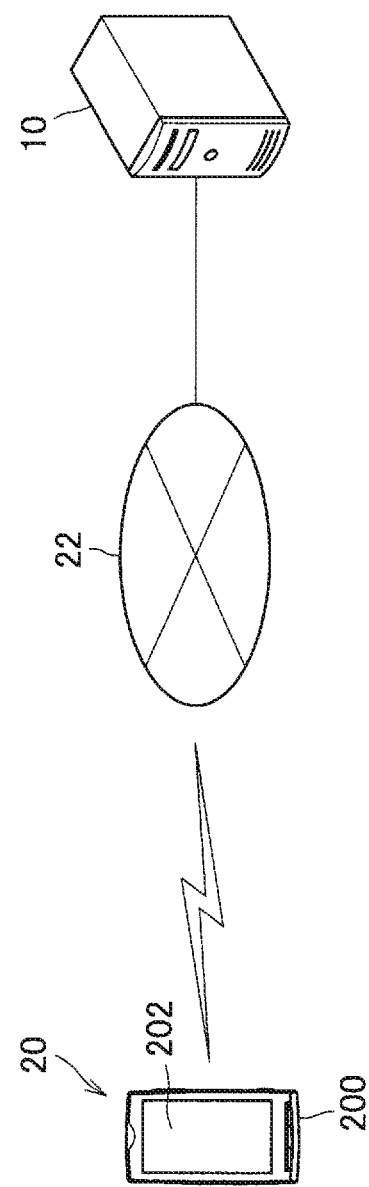
FIG. 1 is a diagram describing a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are cases in the present specification and the diagrams in which a plurality of components having substantially the same functional configuration are distinguished from each other by affixing different letters to the same reference numbers. In one example, a plurality of components having substantially identical functional configuration are distinguished, like servers 10a and 10b, if necessary. However, when there is no particular need to distinguish a plurality of components having substantially the same functional configuration from each other, only the same reference number is affixed thereto. In one example, when there is no particular need to distinguish servers 10a and 10b, they are referred to simply as an server 10.

Further, the "Mode(s) for carrying out the invention" will be described according to the order of the items listed below
1. Configuration of Information Processing System
2. Detailed Description of Embodiment
3. Hardware Configuration
4. Modification Example Configuration of Information Processing System First, a description is given, with reference to FIG. 1, of a configuration of an information processing system according to an embodiment of the present disclosure. As illustrated in FIG. 1, the information processing system includes a server 10, a terminal 20, and a communication network 22.

1-1. Terminal 20

The terminal 20 is an information processing terminal used by a user. For example, the terminal 20 is able to collect a speech when the user speaks and display a display screen.

As illustrated in FIG. 1, the terminal 20 includes, for example, a sound collection unit 200 and an operation display unit 202. The sound collection unit 200 is, for example, a microphone. The sound collection unit 200 detects external sounds (aerial vibration), and converts them into electric signals.

The operation display unit 202 includes a display unit that display a display screen and an operation unit that detects a touch operation by the user. The display unit includes, for example, an LCD (Liquid Crystal Display) device and an OLED (Organic Light Emitting Diode) device. Further, the operation unit includes, for example, a touch panel.

Further, the terminal 20 is able to communicate with other devices via communication network 22 described below. For example, the terminal 20 transmits the speech data collected by the sound collection unit 200 to the server 10 via the communication network 22. It is to be noted that the terminal 20 may collectively transmit, to the server 10, speech data upon a single speech input, for example, or, each time a speech is collected at predetermined time intervals, may transmit sequentially (in real time), to the server 10, only a speech collected at a relevant time.

1-1-1. Modification Example

It is to be noted that an example in which the terminal 20 is a smartphone is illustrated in FIG. 1. However, this is not limitative. For example, the terminal 20 may be a general-purpose PC (Personal Computer), a tablet-type terminal, a gaming machine, a telephone device other than smartphone, a portable-type music player, a television receiver, a robot, or, for example, an HMD (Head Mounted Display), a headset, or a wearable device such as a smartwatch.

Further, the configuration of the terminal 20 is not limited to the above-described example. For example, the terminal 20 may not include the operation display unit 202. In this case, another device (unillustrated) including the above-described display unit and the above-described operation unit may be connected to the communication network 22. It is to be noted that the above-described display unit and the above-described operation unit may be included in a same device, or each may be included in a separate device.

1-2. Server 10

The server 10 is an example of the information processing apparatus according to the present disclosure. The server 10 has a speech recognition function. For example, the server 10 is able to perform speech recognition (cloud speech recognition) on speech data that are received from the terminal 20 via the communication network 22. Further, the server 10 is able to perform various types of language processing on the character string group that is acquired from a speech recognition result. Here, the character string group is one or more character strings.

Further, the server 10 is able to determine one or more cluster segment (hereinafter, referred to as "cluster segment") in relation to the character string group on the basis of a result of language processing performed on the character string group. Here, the cluster segment includes one or more characters. For example, the cluster segment may include one or more terms. More specifically, in a case where language is English, German, etc., the cluster segment may include one or more words, while in a case where language is Japanese, the cluster segment may include one or more phrases.

1-3. Communication Network 22

The communication network 22 is a wired or wireless transmission path for information that is transmitted from a device connected to the communication network 22. For example, the communication network 22 may include a telephone line network, the internet, a public line network such as a satellite communication network, various types of LAN (Local Area Network) such as Ethernet (Registered Trademark), WAN (Wide Area Network), and the like. Further, the communication network 22 may include a dedicated line network such as IP-VPN (Internet Protocol-Virtual Private Network).

1-4. Summary of Issue

A description is given, as described above, of the configuration of the information processing system according to the present embodiment. Here, in order to clearly indicate the features of the present embodiment, a description is given of a determination method of a cluster segment according to a comparative example of the present disclosure. In the present comparative example, with regard to a character string group acquired from a speech recognition result of a collected speech, a cluster segment is determined with use of only a result of language processing on the character segment group. However, there is an issue, in this method, in which the cluster segment may be determined irrespective of a user's intention.

Figure 2:
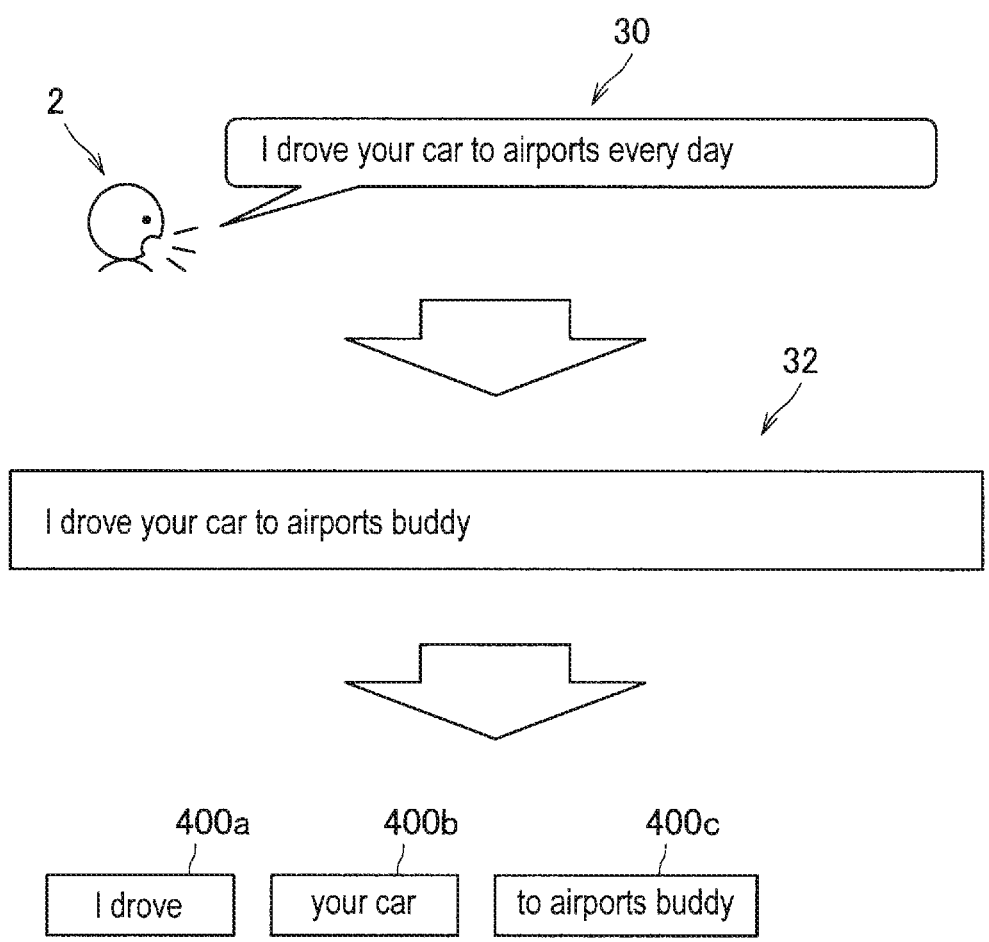
FIG. 2 is a diagram illustrating an example in which a cluster segment is determined in relation to a character string group 32 that is acquired from a speech recognition result according to a comparative example of the present disclosure.

Here, with reference to FIG. 2, a description is given in more detail of the above-described content. FIG. 2 is a diagram illustrating a determination example of a cluster segment according to the present comparative example. In the example illustrated in FIG. 2, a speech 30 of "I drove your car to airports every day" is first made by a user. In this case, in the present comparative example, speech recognition is performed on speech data of the speech 30, and the resulting data is converted into a character string group 32. It is to be noted that FIG. 2 illustrates an example in which the sound of "every day" in the speech is erroneously recognized as "buddy" in the speech recognition.

Thereafter, in the present comparative example, the language processing is performed on the character string group 32, and a plurality of cluster segments 400 is determined, as illustrated in FIG. 2, on the basis of only a result of the language processing.

Incidentally, in a case where, in the example illustrated in FIG. 2, the user normally speaks, the speech corresponding to "to airports" and the speech corresponding to "every day" may typically differ in the sound attribute (for example, a sound speed, a sound volume, etc.) or a period that is determined as a soundless state in a section between the two speeches may be included. Therefore, it is normal and desirable that "to air ports" and "buddy" each be determined as a separate cluster segment.

However, in the present comparative example, the cluster segment is determined only on the basis of the language processing result (i.e. grammar information included in the character string group 32), and thus, a cluster segment 400c of "to airports buddy" is determined. In addition, in this case, even when the user wishes to modify only "buddy", the user has to delete the entire cluster segment 400c, which requires a substantial labor.

Therefore, the server 10 according to the present embodiment has been devised with the above-described circumstance as a main point of view. The server 10 according to the present embodiment acquires a detection result relating to a variation of a sound attribute of a collected speech, and determines, on the basis of the detection result, a cluster segment relating to a character string group acquired from a speech recognition result of the speech on the basis of the detection result. Accordingly, the cluster segment is so determined as to be adapted to the sound attribute of the collected speech, and thus, it is possible to determine the cluster segment of the character string group more appropriately. For example, it is possible to determine a cluster segment in which a speaker's intention is reflected.

2. Detailed Description of Embodiment 2-1. Configuration

Figure 3:
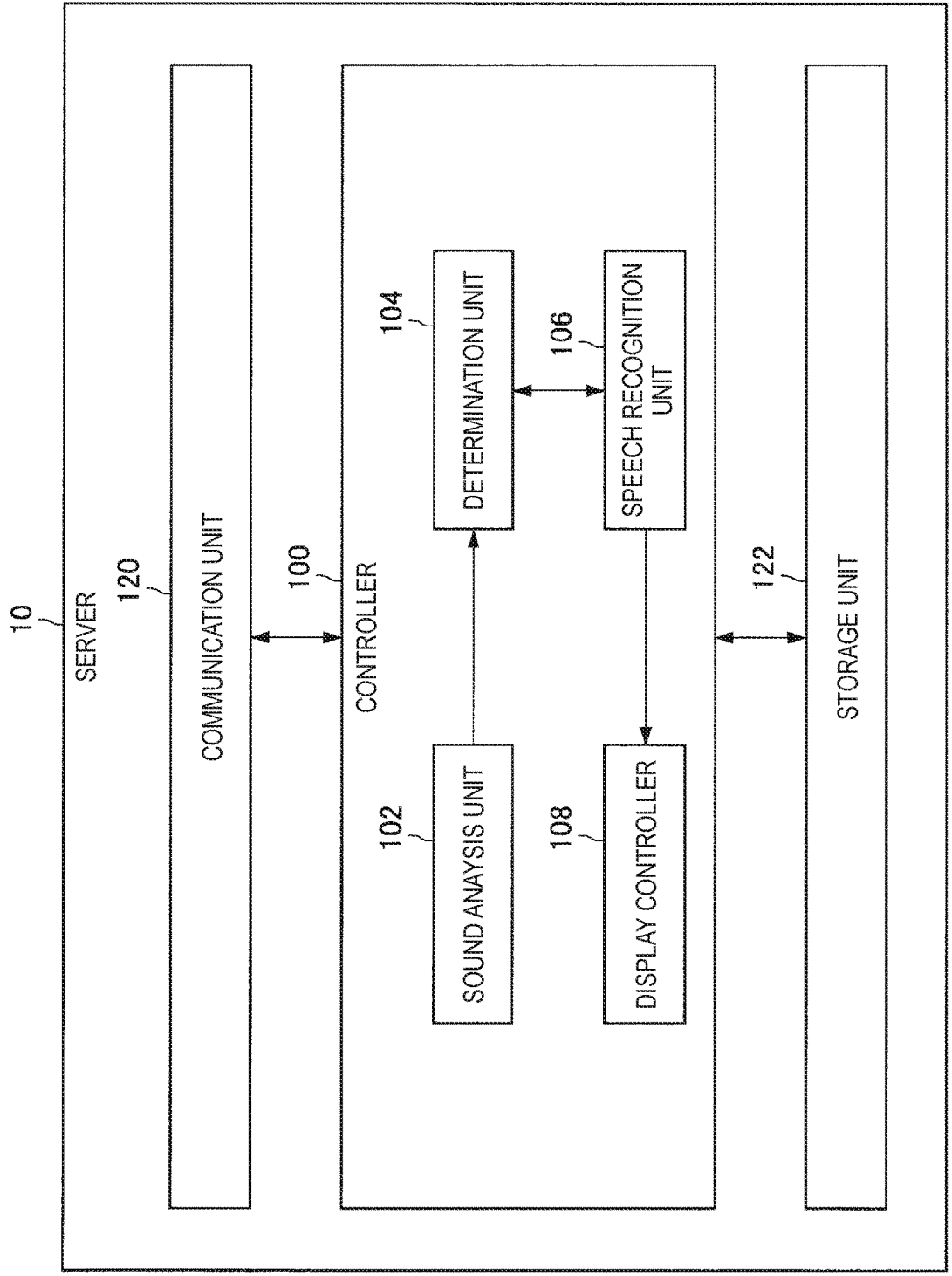
FIG. 3 is a functional block diagram illustrating a configuration example of a server 10 according to an embodiment of the present disclosure.

Next, a description is given in detail of a configuration according to the present embodiment. FIG. 3 is a functional block diagram illustrating a configuration example of the server 10 according to the present embodiment. As illustrated in FIG. 3, the server 10 includes a controller 100, a communication unit 120, and a storage unit 122.

2-1-1. Controller 100

The controller 100 integrally controls the operation of the server 10 with use of hardware such as a later-described CPU (Central Processing Unit) 150 and a later-described RAM (Random Access Memory) 154 that are built in the server 10. Further, as illustrated in FIG. 3, the controller 100 includes a sound analysis unit 102, a determination unit 104, a speech recognition unit 106, and a display controller 108.

2-1-2. Sound Analysis Unit 102

2-1-2-1. Detection of Sound Attribute

The sound analysis unit 102 is an example of an acquisition unit according to the present disclosure. The sound analysis unit 102 detects information relating to a sound attribute of speech data received from the terminal 20. For example, the sound analysis unit 102 detects a variation of the sound attribute on the basis of a speech waveform corresponding to the speech data received from the terminal 20. Here, the sound attribute may include, for example, a sound speed, a sound volume, a pitch (frequency), etc.

Figure 4:
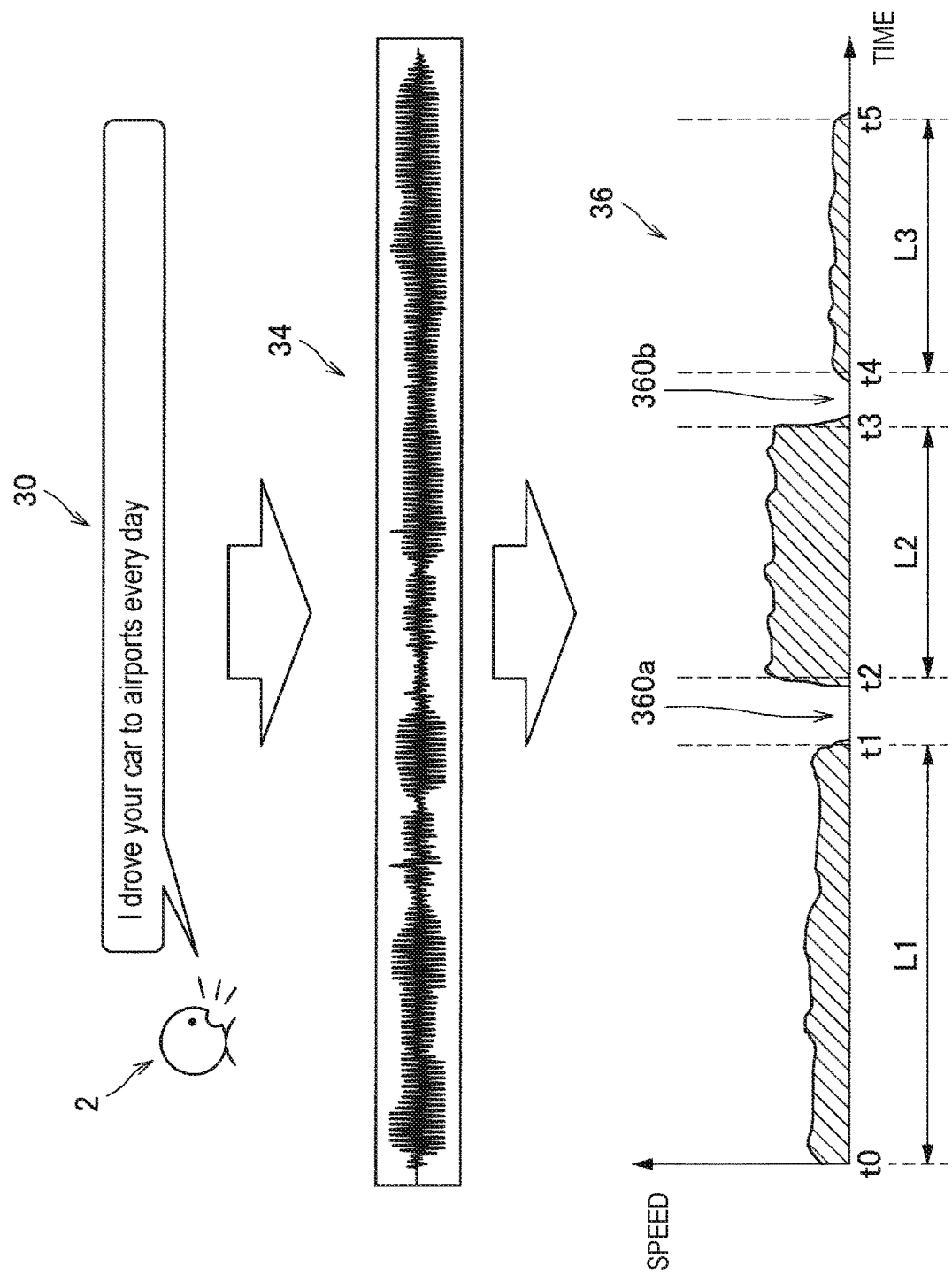
FIG. 4 is a diagram illustrating a portion of a determination example of a cluster segment according to the embodiment.

FIG. 4 is a diagram illustrating an example in which a variation of the sound attribute is detected on the basis of the speech data of the speech 30 that is the same as that of the example illustrated in FIG. 2. As illustrated in FIG. 4, the sound analysis unit 102 first detects a waveform 36 of a speed, for example, on the basis of the speech waveform 34 that is received from the terminal 20 and corresponds to the speech data of the speech 30. Thereafter, the sound analysis unit 102 detects a variation of the sound speed at each piece of timing on the basis of the waveform 36 of the speed.

It is to be noted that, in a case where the speech data upon a single speech input are received sequentially (little by little) from the terminal 20, the sound analysis unit 102 is also able to sequentially detect a relevant sound attribute each time relevant speech data are received.

2-1-2-2. Detection Example of "Pause (pause)"

Further, the sound analysis unit 102 detects a presence or absence of a period that is determined as a soundless state (hereinafter, referred to as "pause") on the basis of the received speech data. Here, the "pause" may be a period in which one or more unit times continue. In the unit time, the number of zero crossing of amplitude of the speech data having the amplitude of no less than a first threshold is less than a second threshold. It is to be noted that, in a case where, in the unit time, the number of zero crossing of the amplitude of the speech data having the amplitude of no less than the first threshold is no less than the second threshold, it may be determined as a sound-existing state. Alternatively, the "pause" may be a short soundless period during a speech (short pause) such as a period of taking a breath during a speech or speech timing corresponding to a punctuation mark in a sentence as a speech target.

For example, in the example illustrated in FIG. 4, the sound analysis unit 102 detects a "pause" 360a and a "pause" 360b based on the speech waveform 34. It is to be noted that, in a case where the speech data upon a single speech input are received sequentially (little by little) from the terminal 20, the sound analysis unit 102 is also able to sequentially detect the "pause" each time relevant speech data is received.

2-1-3. Determination Unit 104

The determination unit 104 determines a cluster segment of a character string group that is acquired from a speech recognition result of the speech data on the basis of a detection result by the sound analysis unit 102 relating to a variation of a sound attribute of the received speech data. For example, the determination unit 104 first specifies one or more sections in which the sound attribute satisfies a predetermined condition on the basis of the detection result relating to the variation of the sound attribute. Thereafter, for each of the specified one or more sections, the determination unit 104 determines a character string group acquired from a result that is recognized by the later-described speech recognition unit 106 as a cluster segment on the basis of the speech corresponding to the section. It is to be noted that the section in which the predetermined condition is satisfied may correspond to a speech section corresponding to a cluster segment (determined by the determination unit 104).

2-1-3-1. Example of Specifying Section

Determination Example 1

Here, a description is given of a specific example of a section in which a predetermined condition is satisfied. For example, the section may be a period from predetermined starting timing until a time immediately before timing at which a value is detected in which an absolute value of a difference from a detected value of a sound attribute at the starting timing is greater than a predetermined threshold. It is to be noted that the predetermined starting timing may be a first detection timing of a sound in speech data, a time immediately after ending timing of a preceding "pause", a time immediately after ending timing of a preceding adjacent section of the section, or the like.

For example, in the example illustrated in FIG. 4, an absolute value of a difference between a detection value of a sound speed at each piece of timing within a section L1 that is a period from a time t0 to a time t1 and a detection value of the sound speed at the time to is no greater than a predetermined threshold. Further, an absolute value of a difference between a detection value of the sound speed at a time immediately after the time t1 and the detection value of the sound speed at the time t0 is greater than the predetermined threshold. In this case, the determination unit 104 specifies the section L1 as a section in which the predetermined condition is satisfied. Similarly, the sound analysis unit 102 specifies a section L2 and a section L3 each as a section in which the predetermined condition is satisfied.

Determination Example 2

Alternatively, the section in which the predetermined condition is satisfied may be a period between adjacent "pauses", or a period that is slightly shorter than the period (for example, the starting timing is later than the starting time of the period by a predetermined time period and the ending timing is earlier than the ending time of the period by a predetermined time period). For example, in the example illustrated in FIG. 4, the determination unit 104 specifies each of the section L1 corresponding to a period until the "pause" 360 is first detected, the section L2 corresponding to a period between the "pause" 360a and the "pause" 360b, and the section L3 corresponding to a period from the ending time of the final "pause" 360 (i.e. the "pause" 360b) to the ending time of the speech data, as the section in which the predetermined condition is satisfied.

Determination Example 3

Alternatively, the section in which the predetermined condition is satisfied may be a continuous section in which a difference between an upper limit value and a lower limit value of the detection value of the sound attribute is no greater than the predetermined threshold.

2-1-3-2. Determination Example of Cluster Segment

Figure 5:
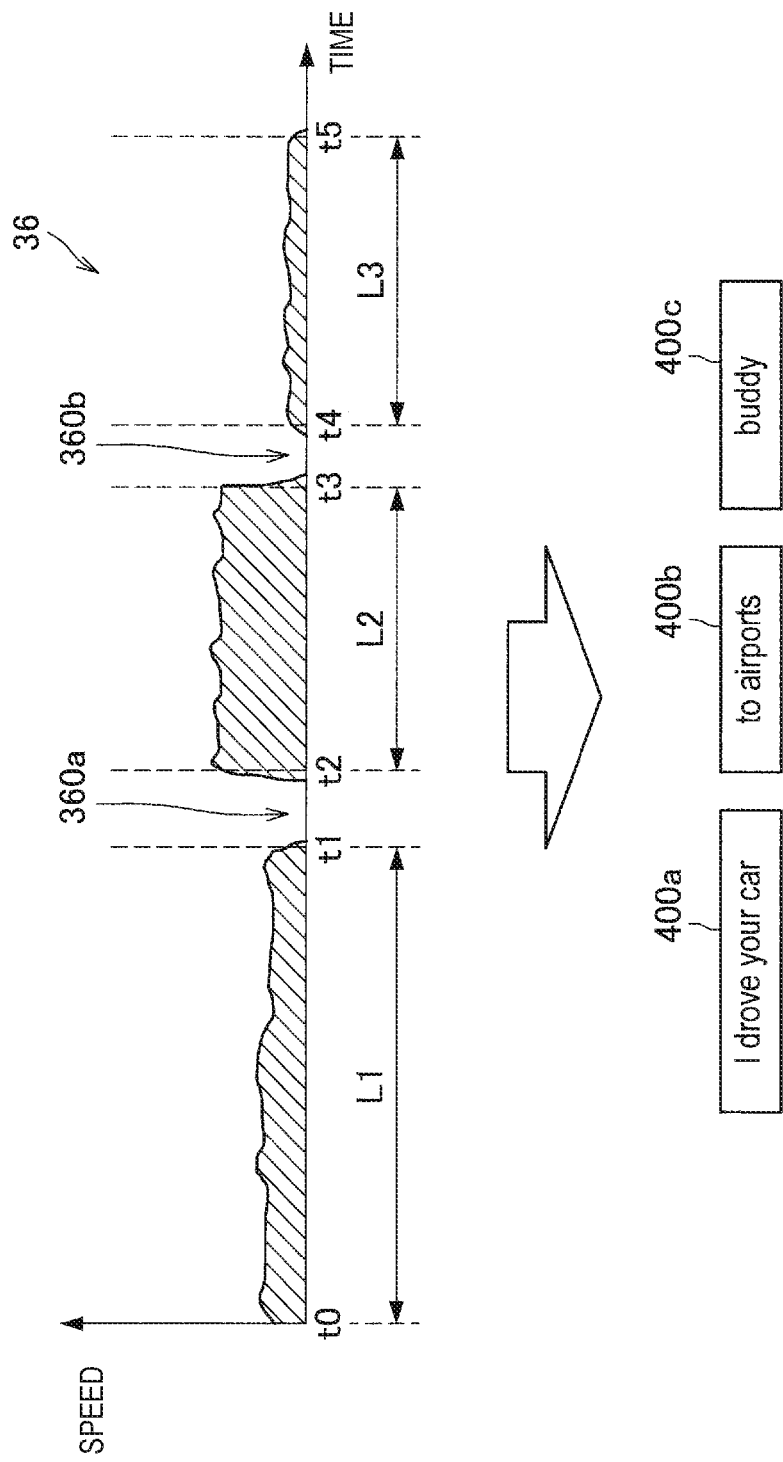
FIG. 5 is a diagram illustrating a portion of a determination example of a cluster segment according to the embodiment.

Next, with reference to FIG. 5, a description is given in detail of the above-described functions by the determination unit 104. FIG. 5 is a diagram illustrating a determination example of the cluster segment of the character string group acquired from the speech recognition result of the speech data of the speech 30 illustrated in FIG. 4. In the example illustrated in FIG. 5, the determination unit 104 first specifies each of the section L1, the section L2, and the section L3 as a section in which a predetermined condition is satisfied. Thereafter, as illustrated in FIG. 5, the determination unit 104 identifies the character string group acquired from the speech recognition result of the speech corresponding to the section L1 as a cluster segment 400a. Similarly, the determination unit 104 determines each of the character string group acquired from the speech recognition result of the speech corresponding to each of the section L2 and the section L3 as a single cluster segment 400. In accordance with the determination example, the cluster segment is determined by reflecting the sound attribute upon a speech. For example, as illustrated in FIG. 5, "to airports" and "buddy" each are determined as a separate cluster segment. As a result, for example, in an application that edits a character string for each cluster segment, in a case where a user wishes to modify "buddy" to "every day", the user may simply delete the "buddy" only, and thus does not need to delete the "to airports". Therefore, the user's modification operation becomes facilitated.

In addition, in a case where the determined cluster segment is modified into another character string group by the user, the cluster segment and the character string group after the modification may be associated with each other, and may be registered (as learning data). It is to be noted that the learning data may be stored, for example, in the storage unit 122.

2-1-4. Speech Recognition Unit 106

The speech recognition unit 106 performs speech recognition on received speech data on the basis of a section specified by the determination unit 104. For example, for each of a plurality of the sections specified by the determination unit 104, the speech recognition unit 106 performs the speech recognition on a speech corresponding to the section.

In the example illustrated in FIG. 5, for each of the section L1, the section L2, and the section L3 that are specified by the determination unit 104, the speech recognition unit 106 performs the speech recognition on the speeches corresponding to the respective sections. For example, the speech recognition unit 106 performs the speech recognition on the speech corresponding to the section L1, and thereafter converts the speech into a character string group ("I drove your car").

2-1-5. Display Controller 108

The display controller 108 performs control to cause one or more cluster segments determined by the determination unit 104 to be displayed on the terminal 20.

Further, for each of the one or more cluster segments, the display controller 108 is also able to cause a character string group of a modification candidate which is associated with the cluster segment to be further displayed on a display screen (of the terminal 20). For example, the above-described learning data, i.e. data that are made by the cluster segment that has been determined in the past and the character string group that has been modified by the user on the cluster segment being associated with each other and registered, may be prepared. In this case, for example, the display controller 108 first confirms whether each of all of the cluster segments determined by the determination unit 104 is stored in the learning data. Thereafter, in a case where at least any of the cluster segments is stored in the learning data, the display controller 108 extracts, from the learning data, the character string group that has been modified in the past which has been associated with the cluster segment and registered, and causes the character string group to be displayed on the display screen.

Figure 6:
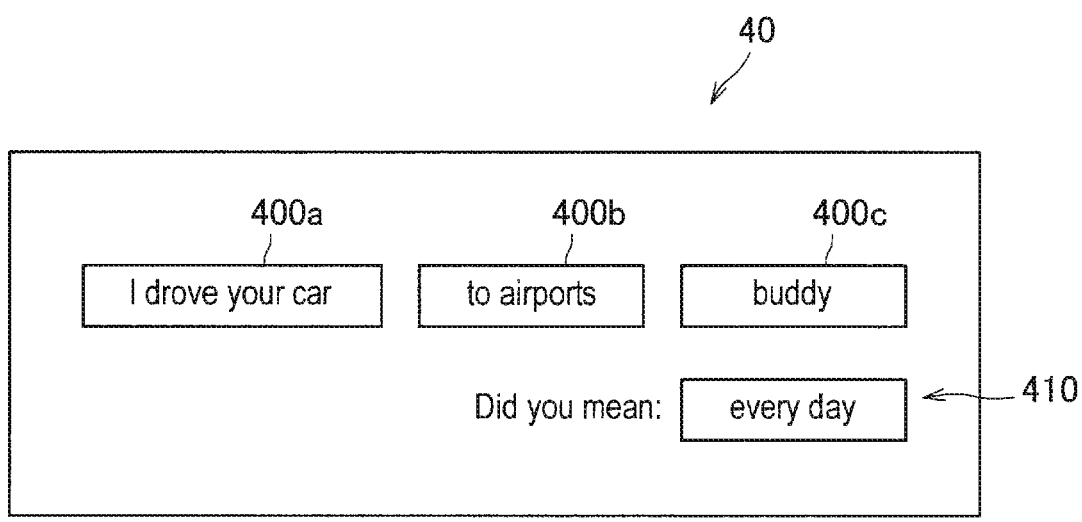
FIG. 6 is a diagram illustrating a display example of the cluster segment according to the embodiment.

FIG. 6 is a diagram illustrating a display example of the plurality of cluster segments 400 on a display screen 40. It is to be noted that FIG. 6 illustrates an example in which the three cluster segments 400 illustrated in FIG. 5 are displayed. Further, in FIG. 6, the fact that the user modified the cluster segment 400c of "buddy" to "every day" in the past is stored in the learning data.

In this case, as illustrated in FIG. 6, the display controller 108 distinguishes, from one another, the three cluster segments 400 that are determined by the determination unit 104 (for example, by enclosing with frames, as illustrated in FIG. 6) to cause the cluster segments to be displayed on the display screen 40. Further, the display controller 108 causes the "every day" associated with the "buddy" to be displayed, as a character string group of a modification candidate 410, at a location relating to a display location of the cluster segment 400c (for example, close to and below the display location, as illustrated in FIG. 6). In accordance with this display example, in a case where the "buddy" is not the character string group that is what the user intends, the user is able to easily modify the "buddy" to "every day" by selecting, for example, the character string group of the modification candidate 410.

2-1-6. Communication Unit 120

The communication unit 120 transmits and receives information from and to another device, for example, via the communication network 22. For example, the communication unit 120 receives the speech data from the terminal 20. Further, the communication unit 120 transmits, to the terminal 20, control information in order to cause one or more determined cluster segments to be displayed in accordance with the control of the display controller 108.

2-1-7. Storage Unit 122

The storage unit 122 stores various data and various types of software.

2-2. Operation

The configuration of the present embodiment is described as above. Next, a description is given of an operation according to the present embodiment with reference to FIGS. 7 and 8. It is to be noted that an operation example at a scene in which the user performs speech input of a character string group to the terminal 20 is described. Further, a description is given below of an example in which the terminal 20 collectively transmits, to the server 10, the speech data upon a single speech input.

Figure 7:
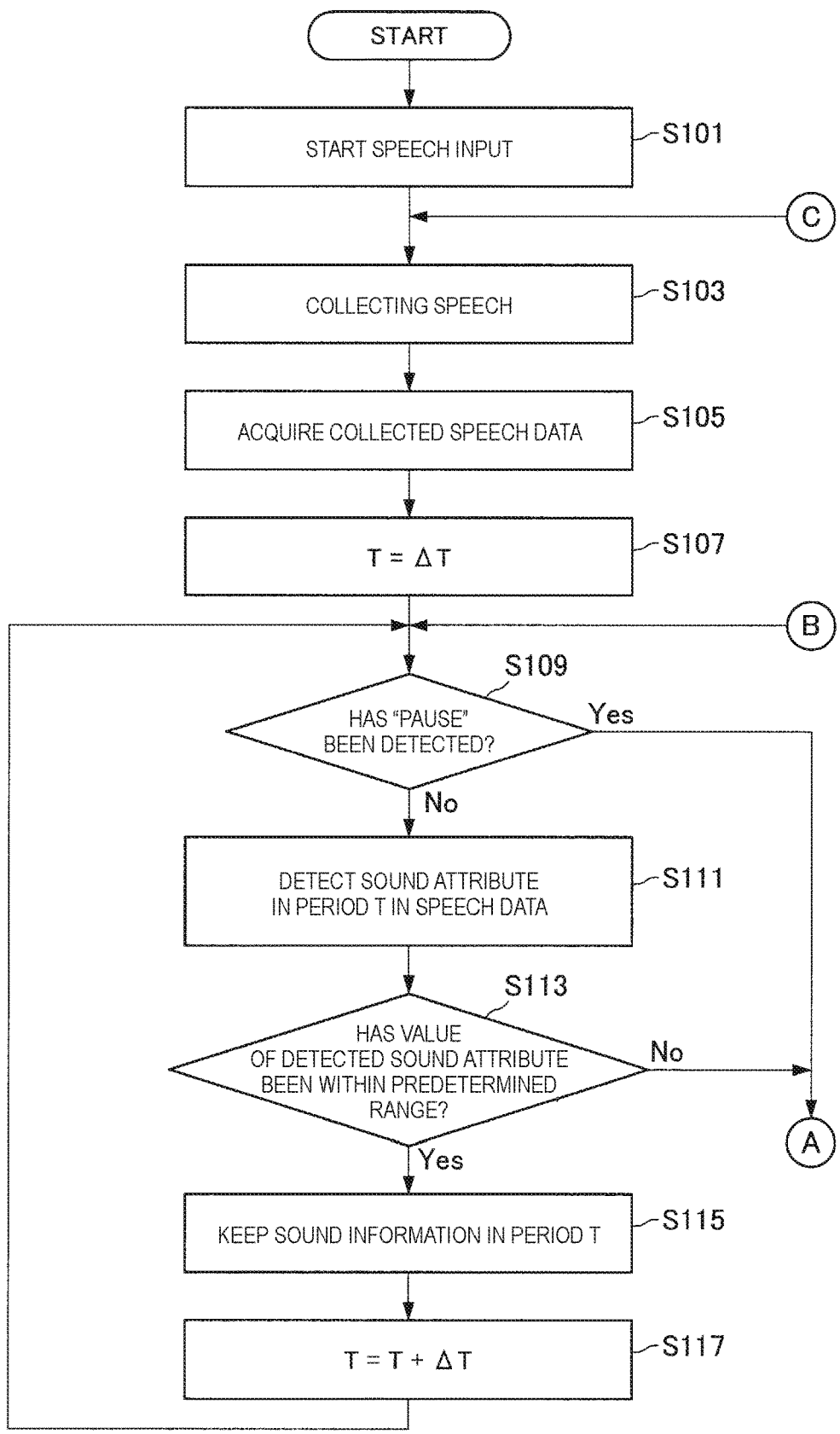
FIG. 7 is a flowchart illustrating a portion of an operation example according to the embodiment.

FIG. 7 is a flowchart illustrating a portion of the operation example according to the present embodiment. As illustrated in FIG. 7, for example, the terminal 20 first activates a speech input application on the basis of a user's predetermined operation to the terminal 20 (S101). Thereafter, the user speaks to the terminal 20, and the sound collection unit 200 collects a speech of the speech (S103).

Next, the terminal 20 transmits the collected speech data to the server 10 (S105).

Thereafter, the sound analysis unit 102 of the server 10 sets an extremely short time ΔT as a period of an analysis target T (S107).

Next, the sound analysis unit 102 determines whether a "pause" in received speech data is detected in the period T (S109). In a case where the "pause" is detected (S109: Yes), the server 10 performs later-described processing of S121.

In contrast, in a case where the "pause" is not detected in the period T (S109: No), the sound analysis unit 102 next detects a sound attribute in the speech data in the period T (for example, a sound speed, a sound volume, etc.) (S111).

Next, the sound analysis unit 102 determines whether or not detection values of the detected sound attribute each are within a predetermined range (S113).

For example, the sound analysis unit 102 determines whether or not an absolute value of a difference of a sound speed that is detected at the starting timing of a section in which the above-described predetermined condition is satisfied and a sound speed that is detected in S111 is within the predetermined range.

In a case where the detection value (at least one kind of the detection values) of the detected sound attribute is out of the predetermined range (S113: No), the server 10 performs later-described processing of S121.

In contrast, in a case where the detection value (all of the kinds of the detection values) of the detected sound attribute is in the predetermined range (S113: Yes), the sound analysis unit 102 temporarily keeps sound information in the period T of the received speech data (S115). Thereafter, the sound analysis unit 102 adds ΔT to T (S117). Thereafter, the server 10 performs processing subsequent to S109 again.

Figure 8:
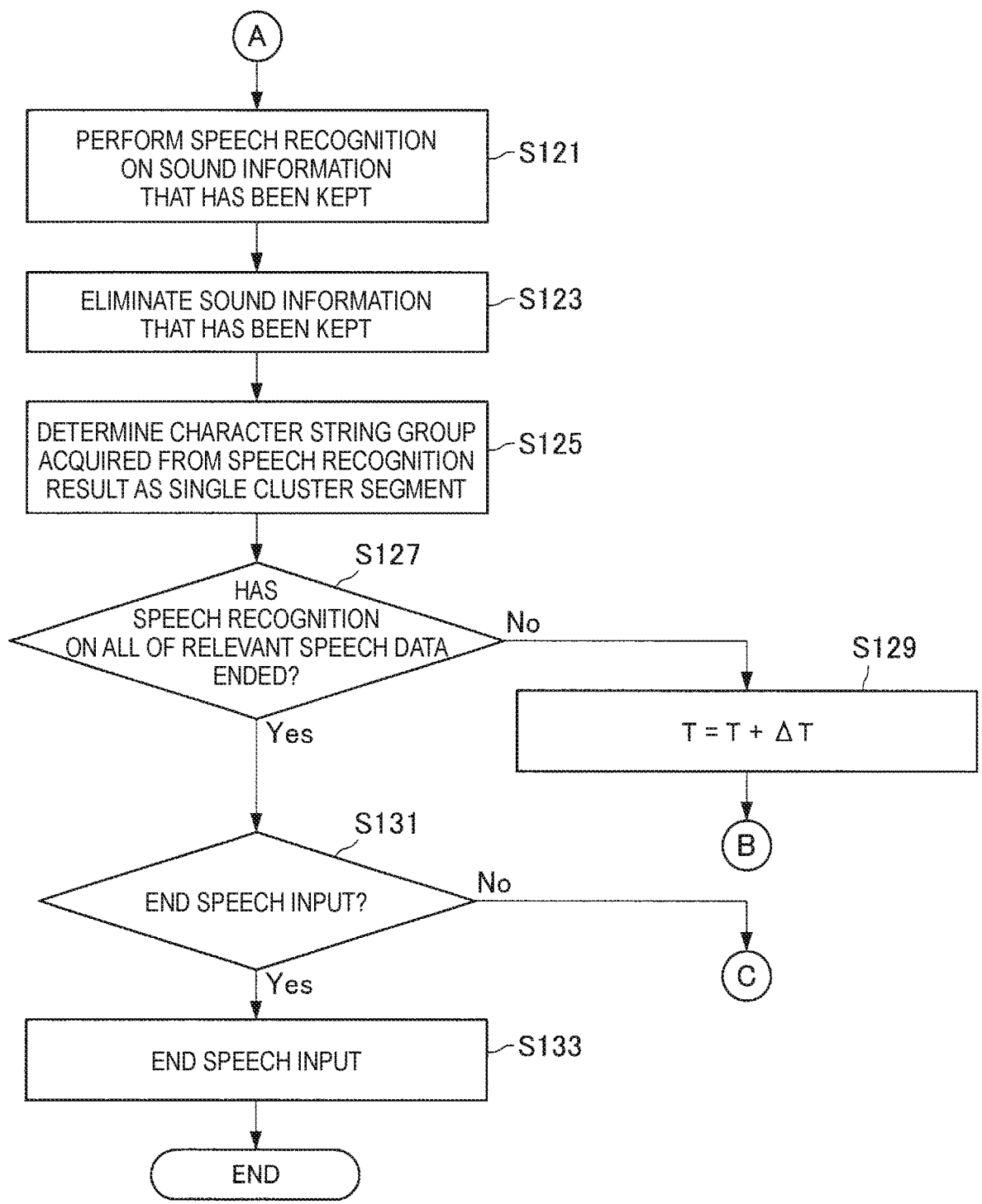
FIG. 8 is a flowchart illustrating a portion of an operation example according to the embodiment.

Here, with reference to FIG. 8, a description is given of processing subsequent to S1121. As illustrated in FIG. 8, the speech recognition unit 106 performs the speech recognition on the sound information that has been currently kept by the sound analysis unit 102, and convers the sound information into a character string group (S121).

Next, the sound analysis unit 102 eliminates the sound information that has been kept (S123).

Next, the determination unit 104 determines the character string group that is converted in S121 as a single cluster segment (S125).

Thereafter, the sound analysis unit 102 determines whether or not the speech recognition on all of the speech data has ended (S127). In a case where the speech recognition on all of the speech data has not ended (S127: No), the sound analysis unit 102 adds ΔT to T (S129). Thereafter, the server 10 performs processing subsequent to S109 again.

In contrast, in a case where the speech recognition on all of the speech data has ended (S127: Yes), and an operation of ending the speech input is performed by the user (S131: Yes), the terminal 20 ends the speech input application (S133). Thereafter, the present operation ends.

In contrast, in a case where the operation of ending the speech input is not performed (S131: No), processing subsequent to S103 is performed again.

2-3. Effects

As described above, according to the present embodiment, the server 10 acquires a detection result relating to a variation of a sound attribute of a collected speech, and determines, on the basis of the detection result, a cluster segment of a character string group acquired from a speech recognition result of the speech. Accordingly, the cluster segment is so determined as to be adapted to the sound attribute of the collected speech, and thus, it is possible to determine the cluster segment of the character string group more appropriately.

In general, when a user normally speaks, a sound attribute (for example, a sound speed, a sound volume, etc.) of the speech corresponding to the cluster segment may differ for each of the cluster segments that the user intends (for a speech recognition result of the speech). Alternatively, a "pause" may be included between sections of the speech corresponding to the individual cluster segments that the user intends. Accordingly, the server 10 determines the cluster segments with use of a detection result relating to the variation of the sound attribute of the collected speech, it is possible to determine the cluster segments in which the speaker's intention is reflected. For example, as in the examples illustrated in FIGS. 4 and 5, even in a case where a recognition result of a portion of the speech includes an error, it is still possible to determine the cluster segment in which the speaker's intention is reflected, which is different from the comparative example of the present disclosure, for example. As a result, the modification operation of the user for the cluster segment becomes facilitated, and thus, convenience is high, for example, in a case where a speech recognition result includes an error.

Further, according to the present embodiment, an effect is acquired in which, in a case where a cluster segment that is different from the speaker's intention is determined, the speaker intentionally changes the way of speaking (for example, changing a sound attribute, providing a "pause", and the like), and thereby, a cluster segment is newly determined as the speaker intends.

3. Hardware Configuration

Figure 9:
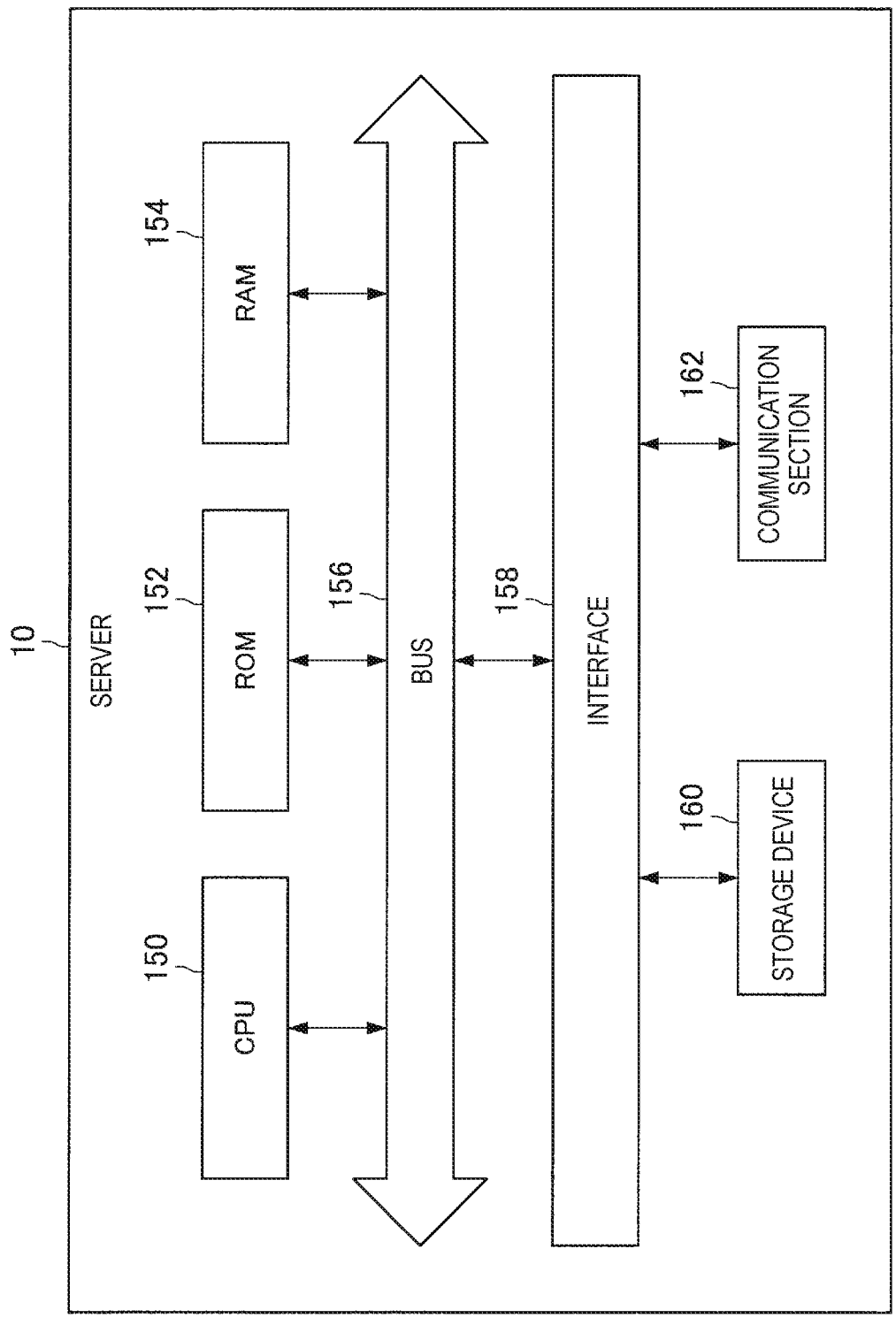
FIG. 9 is a diagram describing a hardware configuration example of the server 10 according to an embodiment of the present disclosure.

A description is given next of a hardware configuration of the server 10 according to the present embodiment with reference to FIG. 9. As illustrated in FIG. 9, the server 10 includes a CPU 150, ROM (Read Only Memory) 152, RAM 154, a bus 156, an interface 158, a storage device 160, and a communication section 162.

The CPU 150 functions as arithmetic operation processor and a control device, and controls the entire operation in the server 10 in accordance with various programs. Further, the CPU 150 achieves the function of the controller 100. It is to be noted that the CPU 150 includes a processor such as a microprocessor.

The ROM 152 stores control data such as programs, operation parameters, etc. that are used by the CPU 150.

The RAM 154 temporarily stores the programs executed by the CPU 150, for example.

The bus 156 includes a CPU bus, etc. The bus 156 is mutually connected to the CPU 150, the ROM 152, and the RAM 154.

The interface 158 connects the storage device 160 and the communication section 162 with the bus 156.

The storage device 160 is a data storage device that serves as the storage unit 122. The storage device 160 includes, for example, a storage medium, a recording device that causes data to be recorded in the storage medium, a reading device that reads the data from the storage medium, or a deleting device that deletes the data that are recorded in the storage medium, and the like.

The communication section 162 is a communication interface that includes a communication device, etc. that is connected to the communication network 22, for example. Further, the communication section 162 may be a wireless LAN-compatible communication section, an LTE (Long Term Evolution)-compatible communication section, or a wired communication section that performs wired communication. The communication section 162 serves as the communication unit 120.

4. Modification Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modification Example 1

For example, the server 10 (the determination unit 104) is also able to dynamically determine a cluster segment of a character string group that is acquired from a speech recognition result of received speech data on the basis of a predetermined condition. For example, the determination unit 104 may further dynamically determine the cluster segment of the character string group on the basis of a detection result of a noise (for example, a noise level, etc.) included in the received speech data.

Alternatively, for example, attribute information of a speaker (sex, age, etc.) and a frequency of a spoken sound (or a characteristic of the frequency) may be associated with each other and thus may be registered. In this case, the determination unit 104 is also able to specify the attribute information of the speaker on the basis of a detection result of the frequency of the sound of the received speech data. Further, the determination unit 104 may dynamically determine the cluster segment of the character string group on the basis of the specified attribute information. This makes it possible to determine the cluster segment in which the attribute of the speaker is further reflected. Therefore, the cluster segment may be determined in accordance with the user's intention.

4-2. Modification Example 2>

It is to be noted that a scene is also considered in which a speech including a plurality of languages is made. Here, as another modification example, the server 10 (the determination unit 104) may dynamically determine a cluster segment of a character string group on the basis of a detection result of switching between a sound of a speech in the first language and a sound of a speech in the second language, in received speech data. For example, the determination unit 104 may determine a plurality of cluster segments so that separate cluster segments are formed, with a portion at the switching as a boundary therebetween.

4-3. Modification Example 3

Further, the configuration of the information processing system according to the present embodiment is not limited to the example illustrated in FIG. 1. For example, the server 10 is illustrated as a single server in FIG. 1; however, this is not limitative. A plurality of computers may cooperatively operate to thereby achieve the above-described functions of the server 10. Further, the terminal 20 is illustrated as a single terminal in FIG. 1; however, this is not limitative. The present information processing system may include a plurality of terminals 20.

4.4 Modification Example 4

Further, the configuration of the server 10 according to the present embodiment is not limited to the example illustrated in FIG. 3. For example, at least one of the sound analysis unit 102, the speech recognition unit 106, and the display controller 108 may be included in another device that is able to be communicated with the server 10 such as the terminal 20, instead of being included in the server 10.

4-5. Modification Example 5

Further, in the above-described embodiment, the example is described in which the information processing apparatus according to the present disclosure is the server 10; however, the present disclosure is not limited to the example. For example, in a case where the terminal 20 has at least the function of the determination unit 104, the information processing apparatus may be the terminal 20. In this case, for example, the terminal 20 first detects a variation of an attribute of a sound of collected speech data, to thereby specify one or more sections that satisfy the above-described predetermined condition (i.e. a speech section corresponding to the cluster segment). Thereafter, the terminal 20 transmits the speech data and information of the specified one or more sections to the server 10. Thereafter, the server 10 performs speech recognition on the received speech data on the basis of each of pieces of information of the received one or more sections, and converts the speech data into a character string group. Thereafter, the server 10 transmits each of a plurality of converted character string groups to the terminal 20. This allows an effect similar to that of the above-described embodiment to be acquired.

In addition, the terminal 20 may include all of the constituent elements included in the above-described controller 100. In this case, the server 10 may not be necessarily provided.

4-6. Modified Example 6

Further, the steps in the operation of the embodiment described above are not necessarily to be executed in the described order. In one example, the steps may be executed in the order changed as appropriate. In addition, the steps may be executed in parallel or individually in part, instead of being executed in chronological order. In addition, some of the steps described may be omitted, or an additional step may be added.

Further, according to the above-described embodiments, for example, a computer program for causing hardware such as the CPU 150, the ROM 152, and the RAM 154 to execute a function equivalent to each configuration of the server 10 according to the embodiment described above can be provided. In addition, a recording medium on which the computer program is recorded is provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)
An information processing apparatus including:
an acquisition unit that acquires a detection result relating to a variation of a sound attribute of a collected speech; and
a determination unit that determines, on the basis of the detection result, a cluster segment relating to a character string group that is specified on the basis of speech recognition of the speech.

(2)
The information processing apparatus according to (1), in which the sound attribute includes a sound speed.

(3)
The information processing apparatus according to (1) or (2), in which the sound attribute includes a sound volume.

(4)
The information processing apparatus according to any one of (1) to (3), in which the sound attribute includes a sound frequency.

(5)
The information processing apparatus according to any one of (1) to (4), in which the detection result relating to the variation of the sound attribute of the speech includes a detection result of a predetermined period that is determined as a soundless state.

(6)
The information processing apparatus according to (5), in which the predetermined period that is determined as the soundless state is a period in which one or more predetermined unit periods in which the number of zero crossing of amplitude of a sound having the amplitude of no less than a first threshold is less than a second threshold continue.

(7)
The information processing apparatus according to any one of (1) to (6), in which the determination unit specifies one or more sections in which the sound attribute satisfies a predetermined condition on the basis of the detection result, and determines a cluster segment relating to the character string group on the basis of the specified one or more sections.

(8)
The information processing apparatus according to (7), in which the determination unit determines, as a single cluster segment, a character string group in accordance with a recognition result of a speech corresponding to the section.

(9)
The information processing apparatus according to (8), in which the section is a period in accordance with an interval from starting timing of the section until timing at which a value is detected in which an absolute value of a difference from a value of the sound attribute which is detected at the starting timing is greater than a predetermined threshold.

(10)
The information processing apparatus according to (8), in which the starting timing of the section is timing in accordance with timing at which an ending of a preceding predetermined period that is determined as a soundless state is detected.

(11)
The information processing apparatus according to (8), in which the section is a period in accordance with an interval between a first period that is determined as a soundless state and a second period that is determined as the soundless state.

(12)
The information processing apparatus according to (8), in which the section is a continuous section in which an absolute value of a difference between an upper limit value and a lower limit value of a detection value of the sound attribute is no greater than a predetermined threshold.

(13)

The information processing apparatus according to any one of (8) to (12), in which the acquisition unit further acquires the speech, the information processing apparatus further includes a speech recognition unit that performs recognition on a speech corresponding to the section, and the determination unit determines a cluster segment relating to the character string group on the basis of a recognition result by the speech recognition unit.

(14)

The information processing apparatus according to (13), in which the determination unit specifies a plurality of the sections on the basis of the detection result, the speech recognition unit performs the recognition on the speech corresponding to each of the plurality of the sections, and the determination unit determines, for each of the plurality of the sections, a character string group in accordance with a recognition result of the speech corresponding to the section by the speech recognition unit, as a single cluster segment.

(15)

The information processing apparatus according to any one of (1) to (14), in which the determination unit further determines a cluster segment relating to the character string group on the basis of a detection result of a noise included in the speech.

(16)

The information processing apparatus according to any one of (1) to (15), in which the determination unit further determines a cluster segment relating to the character string group on the basis of information relating to a speaker of the speech specified on the basis of the detection result.

(17)

The information processing apparatus according to any one of (1) to (16), in which the speech includes a speech in first language and a speech in second language, and the determination unit further determines a cluster segment relating to the character string group on the basis of a detection result of switching between the speech in the first language and the speech in the second language.

(18)

The information processing apparatus according to any one of (1) to (17), further including:

a display controller that causes one or more cluster segments determined by the determination unit to be displayed on a display screen, in which the display controller further causes a character string group of a modification candidate to be displayed on the display screen on the basis of each of the one or more cluster segments.

(19)

An information processing method including:

acquiring a detection result relating to a variation of a sound attribute of a collected speech; and determining, by a processor on the basis of the detection result, a cluster segment relating to a character string group that is specified on the basis of speech recognition of the speech.

(20)

A program that causes a computer to function as:

an acquisition unit that acquires a detection result relating to a variation of a sound attribute of a collected speech; and a determination unit that determines, on the basis of the detection result, a cluster segment relating to a character string group that is specified on the basis of speech recognition of the speech.

REFERENCE SINGS LIST 10 server
20 terminal
22 communication network
100 controller
102 sound analysis unit
104 determination unit
106 speech recognition unit
108 display controller
120 communication unit
122 storage unit
200 sound collection unit
202 operation display unit

The invention claimed is:

1. An information processing apparatus comprising:
an acquisition unit configured to acquire a detection result relating to a variation of a sound attribute of a collected speech; and
a determination unit configured to determine, on a basis of the detection result, a cluster segment relating to a character string group that is specified on a basis of speech recognition of the collected speech,
wherein the collected speech includes a speech in a first language and a speech in a second language,
wherein the determination unit further determines the cluster segment relating to the character string group on a basis of a detection result of switching between the speech in the first language and the speech in the second language, and
wherein the acquisition unit and the determination unit are each implemented via at least one processor.

2. The information processing apparatus according to claim 1, wherein the sound attribute includes a sound speed.

3. The information processing apparatus according to claim 1, wherein the sound attribute includes a sound volume.

4. The information processing apparatus according to claim 1, wherein the sound attribute includes a sound frequency.

5. The information processing apparatus according to claim 1, wherein the detection result relating to the variation of the sound attribute of the collected speech includes a detection result of a predetermined period that is determined as a soundless state.

6. The information processing apparatus according to claim 5, wherein the predetermined period that is determined as the soundless state is a period in which one or more predetermined unit periods in which a number of zero crossing of amplitude of a sound having the amplitude of no less than a first threshold is less than a second threshold continue.

7. The information processing apparatus according to claim 1, wherein the determination unit is further configured to specify one or more sections in which the sound attribute satisfies a predetermined condition on the basis of the detection result, and further determines the cluster segment relating to the character string group on a basis of the specified one or more sections.

8. The information processing apparatus according to claim 7, wherein the determination unit determines, as a respective cluster segment, a respective character string group in accordance with a recognition result of a respective speech of the collected speech corresponding to a respective section of the specified one or more sections.

9. The information processing apparatus according to claim 8, wherein each respective section is a period in accordance with an interval from starting timing of the respective section until timing at which a value is detected in which an absolute value of a difference from a value of the sound attribute which is detected at the starting timing is greater than a predetermined threshold.

10. The information processing apparatus according to claim 8, wherein the starting timing of the respective section is timing in accordance with timing at which an ending of a preceding predetermined period that is determined as a soundless state is detected.

11. The information processing apparatus according to claim 8, wherein the respective section is a period in accordance with an interval between a first period that is determined as a soundless state and a second period that is determined as the soundless state.

12. The information processing apparatus according to claim 8, wherein the respective section is a continuous section in which an absolute value of a difference between an upper limit value and a lower limit value of a detection value of the sound attribute is no greater than a predetermined threshold.

13. The information processing apparatus according to claim 8,
wherein the acquisition unit further acquires the collected speech,
wherein the information processing apparatus further includes a speech recognition unit configured to perform recognition on the respective speech corresponding to the respective section,
the determination unit further determines the respective cluster segment relating to the respective character string group on a basis of the recognition result by the speech recognition unit, and
wherein the speech recognition unit is implemented via at least one processor.

14. The information processing apparatus according to claim 13,
wherein the determination unit specifies a plurality of the sections on the basis of the detection result,
wherein the speech recognition unit performs the recognition on the respective speech corresponding to each respective section of the plurality of the sections, and
the determination unit determines, for each respective section of the plurality of the sections, the respective character string group in accordance with the recognition result of the respective speech corresponding to the respective section by the speech recognition unit, as a single cluster segment.

15. The information processing apparatus according to claim 1, wherein the determination unit further determines the cluster segment relating to the character string group on a basis of a detection result of a noise included in the collected speech.

16. The information processing apparatus according to claim 1, wherein the determination unit further determines the cluster segment relating to the character string group on a basis of information relating to a speaker of the collected speech specified on the basis of the detection result.

17. The information processing apparatus according to claim 1, further comprising:
a display controller configured to cause one or more cluster segments determined by the determination unit to be displayed on a display screen,
wherein the display controller further causes a character string group of a modification candidate to be displayed on the display screen on a basis of each cluster segment of the determined one or more cluster segments.

18. An information processing method comprising:
acquiring a detection result relating to a variation of a sound attribute of a collected speech; and
determining, by a processor on a basis of the detection result, a cluster segment relating to a character string group that is specified on a basis of speech recognition of the collected speech,
wherein the collected speech includes a speech in a first language and a speech in a second language, and
wherein the cluster segment relating to the character string group is determined on a basis of a detection result of switching between the speech in the first language and the speech in the second language.

19. A non-transitory computer-readable storage medium having embodied thereon a program, which when executed by a computer causes the computer to execute a method, the method comprising:
acquiring a detection result relating to a variation of a sound attribute of a collected speech; and
determining, on a basis of the detection result, a cluster segment relating to a character string group that is specified on a basis of speech recognition of the collected speech,
wherein the collected speech includes a speech in a first language and a speech in a second language, and
wherein the cluster segment relating to the character string group is determined on a basis of a detection result of switching between the speech in the first language and the speech in the second language.

* * * * *